United States Patent Office 2,839,122
Patented June 17, 1958

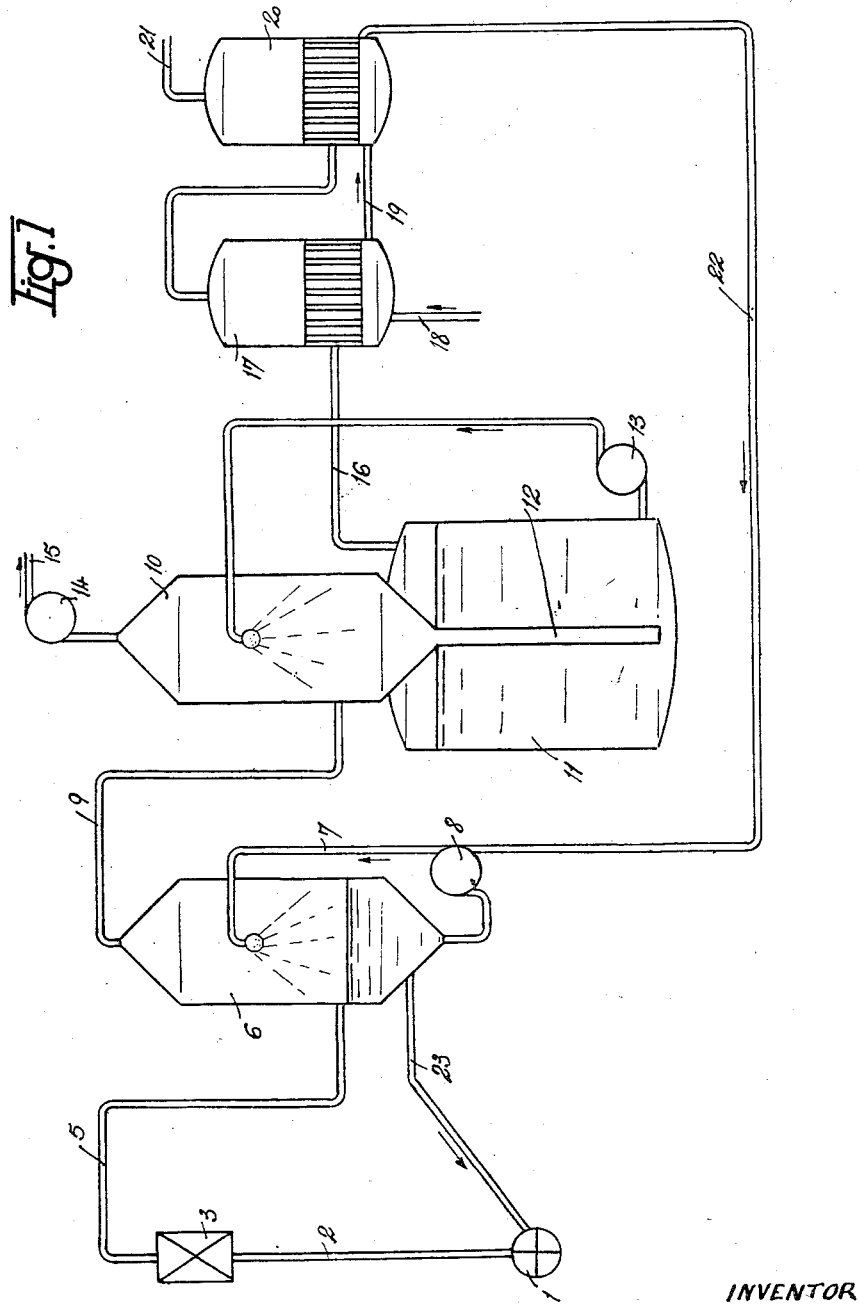

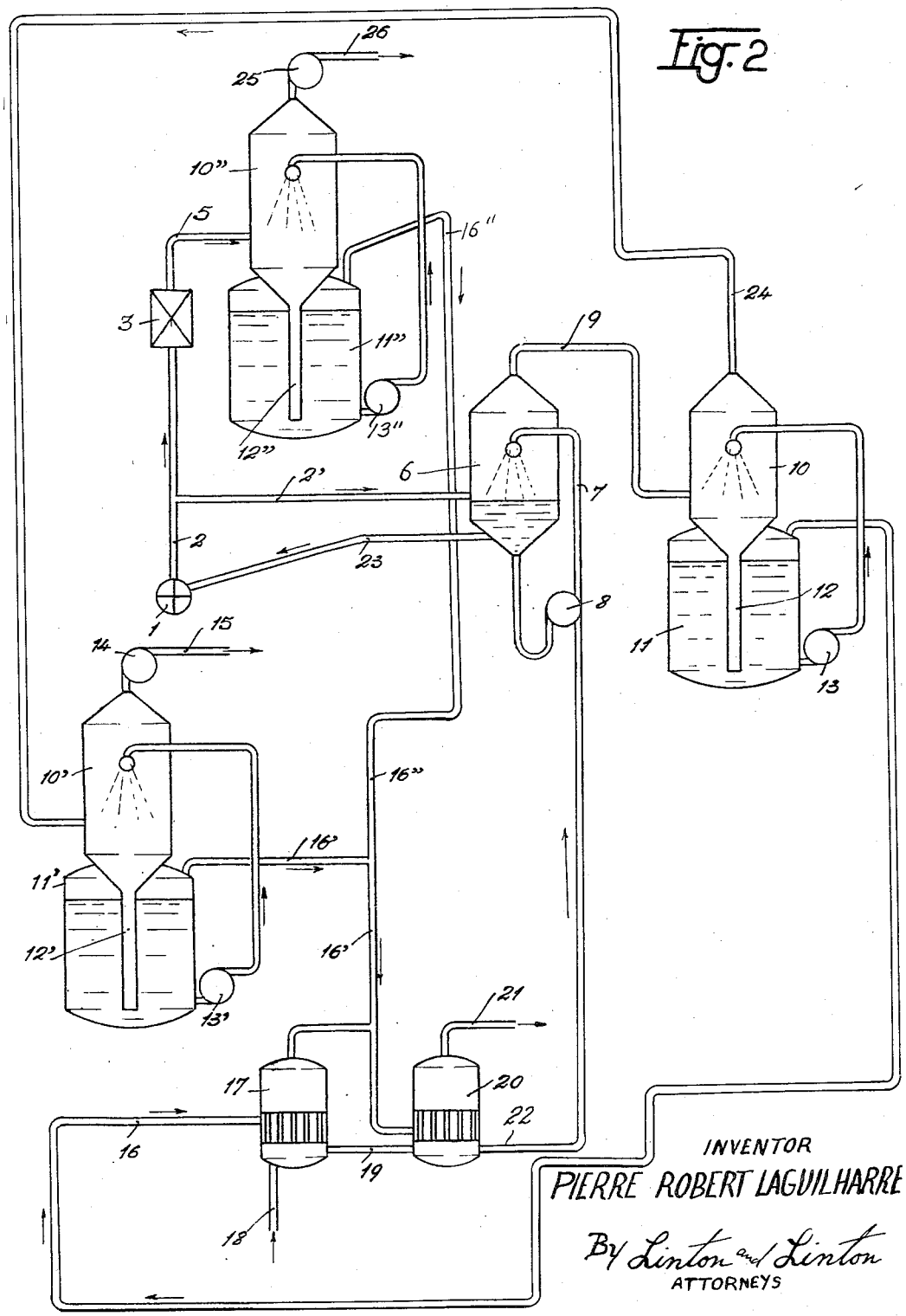

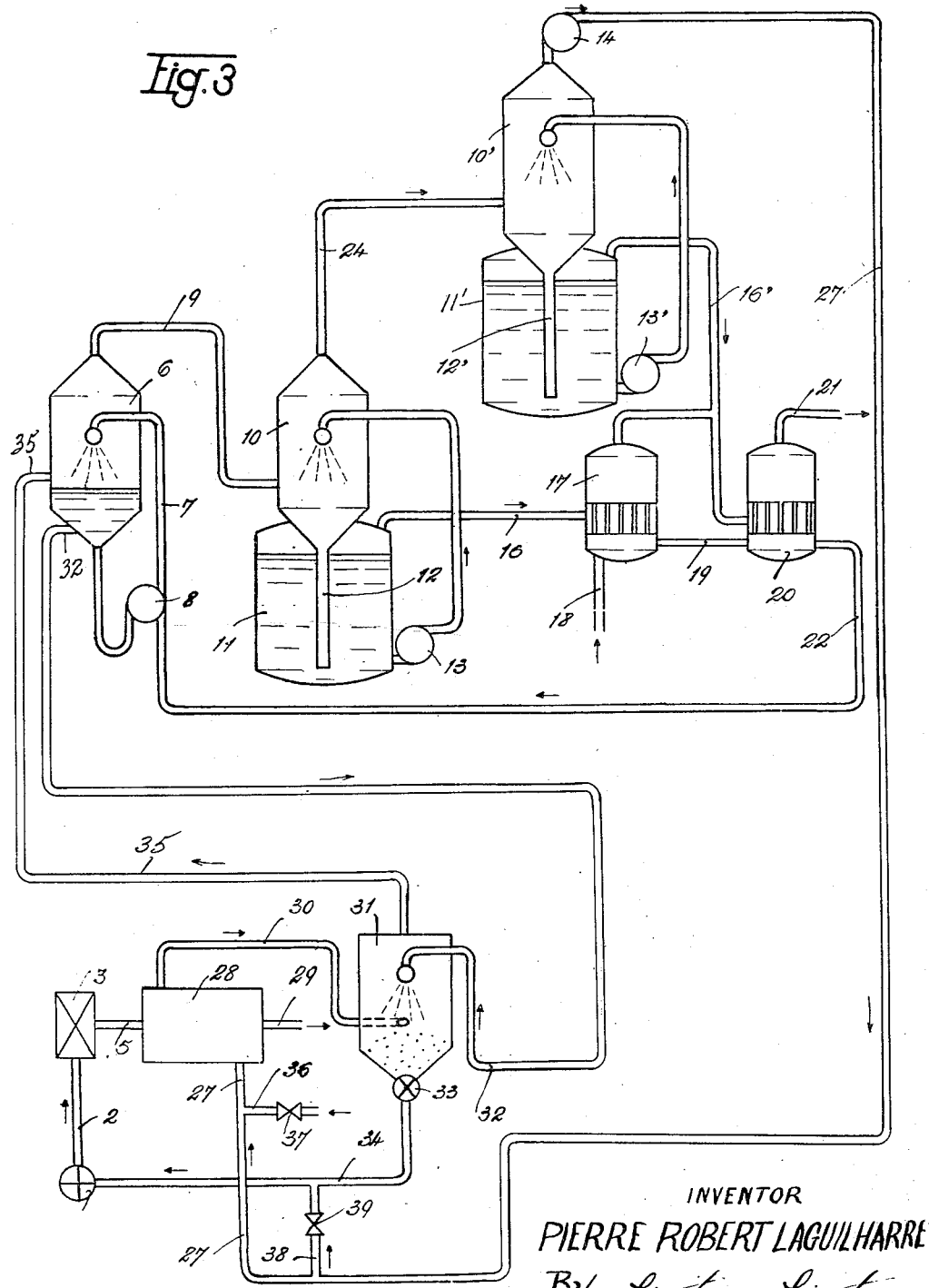

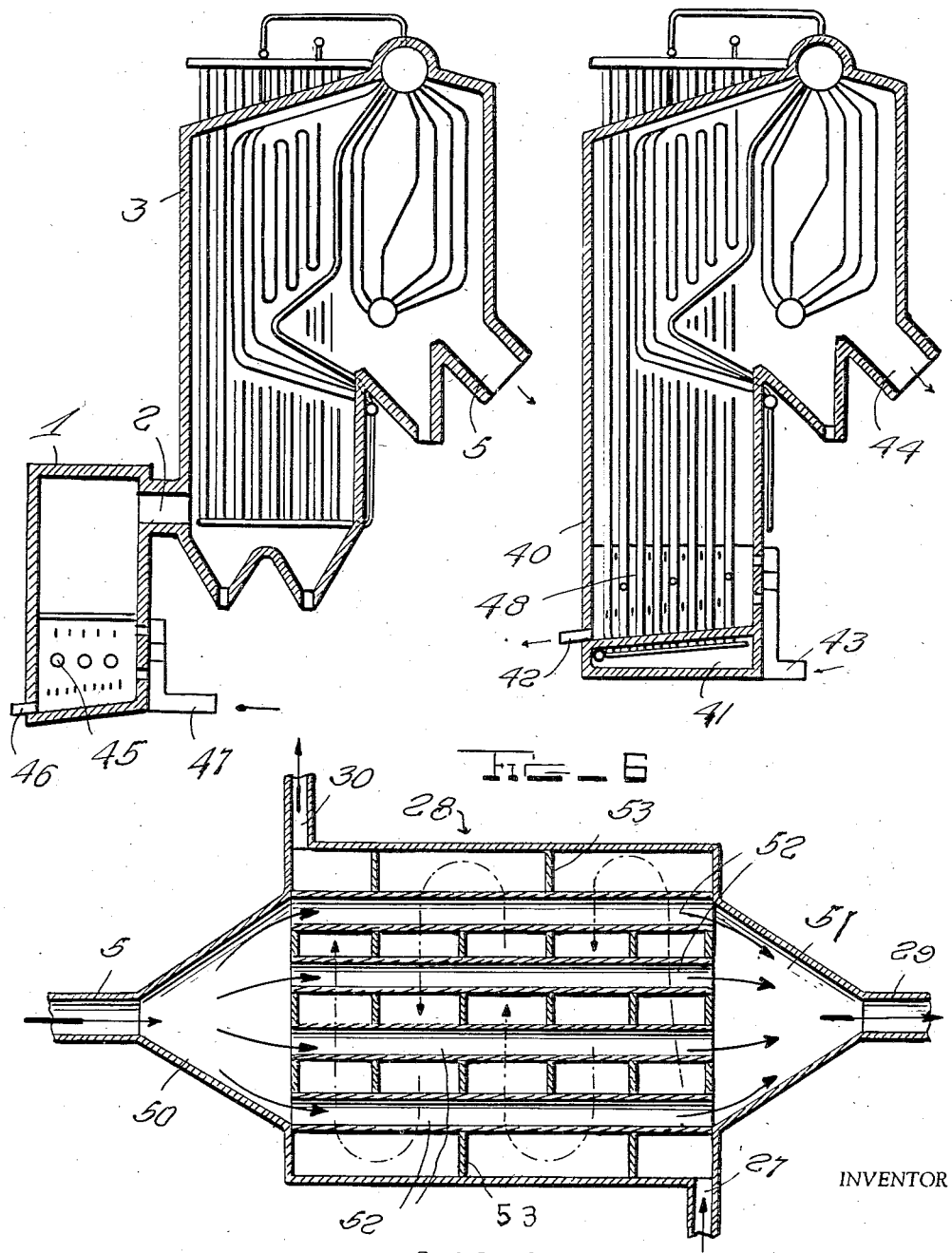

2,839,122

APPARATUS FOR TREATING SOLUTIONS CONTAINING DRY SUBSTANCES HAVING HIGH CALORIFIC VALUE

Pierre Robert Laguilharre, Enghien-Les Bains, France

Application September 10, 1952, Serial No. 308,896

Claims priority, application France September 29, 1951

2 Claims. (Cl. 159—4)

The present invention relates to a process and apparatus for treating solutions containing mainly dry substances having a high calorific power, with a view to recovering the greatest possible part of their calories.

This process is applicable, more particularly, in the treatment of residuary liquors which it is difficult to discharge into the rivers, or residuary liquors containing recoverable salts, such as the residuary liquors from black solutions containing sodium or bi-sulphite as used in paper manufacturing, or in distilleries, etc.

It is known that such residuary liquors are generally heretofore concentrated in a simple or multiple acting evaporator to be thereafter burnt in an oven. The concentrated product may also be dried in a drying apparatus, for instance, and the powder obtained burnt.

The process according to the present invention whereby a high thermal balance-sheet can be obtained, consists essentially, after burning in a furnace the solution to be treated, which has been concentrated to the desired concentration, and blowing the mixture of gas and vapors from the furnace through a boiler, in adding more vapor to the mixture of gas and vapor resulting from the combustion in the furnace by contacting same with the solution to be treated in a spraying evaporator, for instance. Then in recovering the latent heat from almost all the vapors mixed with the gases in at least one spraying condenser (or recuperator) where said vapors condense upon coming into thermal relation with spraying water circulating in an almost closed circuit and preferably at a substantially constant temperature. This required constancy of the temperature of the spraying water of the condenser can be ensured, despite the constant provision of new calories, through an auto-evaporation action by means of a simple or double acting evaporator provided after the condenser and in which the vapors produced by the cooling water preconcentrate the weak solution to be treated.

In order to improve the thermal balance-sheet of the operation, the number of the condensers or recuperators where the latent heat is recovered from the vapors mixed with the gas resulting from the combustion of the solution may be increased by properly grading the temperatures of the spraying water acting in each of said recuperators respectively between the operation temperatures of the evaporators serving for the preconcentration of the weak solution to be treated.

In this particular embodiment of the present invention, the several recuperators may be either series-connected or parallel-series-connected.

In a series-connected arrangement, the recuperators are placed in succession, after the first evaporator that receives the mixture of gas and vapors from the boiler, in such a way that the first recuperator may receive the mixture of gas and vapors at the outlet of said first evaporator whereas the second recuperator receives the mixture of gas and vapors that has been treated in the second evaporator and so on, the vapors produced in the vats of each recuperator being blown respectively to the various double acting evaporators serving to preconcentrate the weak solution to be treated.

Thus, the total amount of water vapor collected in the series recuperators increases since the respective temperatures of the gas coming out of said recuperators decrease. The recovered vapor from the first stage, for instance, is used as many times as there are series recuperators; the recovered vapor from the second stage is used as many times as there are series-recuperators minus one, and so on. It is then obvious that it is possible to make an important economy in calories, as the calories which have not been used are directed, at the outlet of the furnace, to the vapor boiler.

In a parallel-series-arrangement, a first group of recuperators is provided in series in the manner set forth above, a second group of recuperators is so provided as to receive directly the mixture of gas and vapors from the boilers, the mixture of gas and vapors from the furnace where the solution is burnt being divided into two portions, one of which is directed into the evaporator placed before the first group of recuperators and the other one of which is directed into the boiler.

According to a further characteristic of the present invention, the saving in calories may still further be increased by passing the mixture of gas and vapors from the last series-recuperator (in the case of a series arrangement) or from either the last series recuperator, or the last parallel recuperator, or both (in the case of a parallel-series arrangement) into a reheater in which the mixture is heated again either by all or a part of the mixture of gas and vapors from the boiler, or by a diversion of the warm gas from the furnace where the solution is burnt and by again passing the mixture thus heated into the spraying evaporator placed before the first series recuperator.

Under such circumstances, the mixture of gas and vapors serving for the treatment of the liquor circulates in a closed circuit, which reduces to a minimum the loss of the calories of the vapor conveyed and allows for an easy checking of the volume of air circulating also in a closed circuit in the plant.

The arrangement which has been disclosed moreover, according to the invention, affords the advantageous possibility of inserting between the reheater and the spraying evaporator an atomizing-dryer, capable of ensuring the previous drying of the concentrated solution before it is conveyed into the furnace which receives, on the one hand, the mixture of reheated gas and vapors from the reheater and, on the other hand, the concentrated solution collected at the lower part of the spraying evaporator. The mixture of gas and vapors escaping from the top of said atomizer-drier being passed into the spraying evaporator while the powder resulting from the drying which collects at the lower part is conveyed into the furnace.

According to a further characteristic of the present invention, it is possible to provide for the admission of fresh air in the circuit to prevent the mixture of gas and vapors from being saturated with volatile products, said admission of fresh air taking place, for instance, at a point of the pipe driving the mixture of gas and vapors to be reheated into the reheater and means being provided to divert towards the furnace the excess of gas and vapors that may exist in the plant.

The attached drawings illustrate by way of non-limitative examples three embodiments of the apparatus for carrying out the process according to the present invention.

In the drawings:

Fig. 1 illustrates diagrammatically as a first embodiment a plant comprising a single recuperator.

Fig. 2 is a diagrammatical illustration as a second embodiment of a plant comprising several parallel-series connected recuperators.

Fig. 3 is a diagrammatical illustration as a third embodiment of a plant comprising several series-connected recuperators and a closed-circuit of the mixture of gas and vapors and an atomizing drier for the previous drying of the concentrated solution.

Fig. 4 shows for the plant of Fig. 1 the details of a boiler and a furnace which are separately constructed.

Fig. 5 shows for the plant of Fig. 1 the details of a combined boiler and furnace.

Fig. 6 shows for the plant of Fig. 3 the details of the indirect heat exchanger.

In the example of Figure 1, 1 is a furnace of conventional construction in which the concentrated solution is burnt. The gases and vapors at 1500° C., for instance, resulting from the combustion, pass through the duct 2 into a boiler 3 whence the gases mixed with vapors pass out through pipe 5 at a temperature lower than that at which they were before entering the boiler, of the range, for instance, of 400° to 500° C. but not saturated.

Said mixture of gas and vapors resulting from the combustion of the concentrated liquor after it has passed through the boiler is driven through the pipe 5 into a spray evaporator 6 in which it meets a liquid spray brought through the duct 7, formed, in part, as will be shown later on, with preconcentrated liquor and, in part, with the concentrated liquor drawn from the bottom of the evaporator and forced back into evaporator 6 by the circulation pump 8.

The mixture of gas and vapors coming out of pipe 9 from the top of evaporator 6, at a temperature of about 150° C. for instance, enters a mixing condenser or recuperator 10 in which it meets a liquid spray from the vat 11 which forms the base of said recuperator and into which flows, through the pipe 12, the cooling water which a pump 13 constantly causes to circulate in a closed circuit from vat 11 to condenser 10.

An exhaust blower 14 draws the gases from the top of the recuperator and exhausts them through duct 15 at a temperature of 65° C. for instance. As to the vapors produced in the vat 11 of the recuperator, they are passed through a duct 16 at a temperature of 60° for instance, in a first tubular evaporator 17 which receives through 18 the weak solution to be treated. Said solution, which is already slightly concentrated, passes through the duct 19 into a second tubular evaporator 20 heated with vapor at 50° for instance from the first tubular evaporator 17 and discharges through duct 21 a vapor at 40° C. for instance while the solution preconcentrated in both tubular evaporators comes out through pipe 22 to go to the spraying evaporator 6.

The above mentioned temperatures are employed, of course, by examples only, and for a better understanding of the operation of the arrangement. As is apparent, the weak solution to be treated concentrates gradually in the two tubular evaporators 17 and 20 then in the spraying evaporator 6 and is thus brought to the desired rate of concentration where it passes through pipe 23 to furnace 1 to be burnt. This concentration is effected by using a large part of the calories of the dry material contained in the liquor treated.

The cooling water of the recuperator 10 must be at a suitable temperature (such as 60° C. in the example above mentioned) and have a delivery properly selected so that the major part of the vapors still held by the gases passing through duct 9 to said recuperator may condense giving off the latent heat thereof.

If the tubular evaporators 17 and 20 of Fig. 1 (which may be of any appropriate number) were not provided after the recuperator 10, the temperature of the spraying water in vat 11 would tend to rise and, therefore, the recovery of the latent heat would decrease. The provision of this simple or double acting evaporator after the recuperator keeps substantially constant, through auto-evaporation, the temperature of said spraying water circulating in said closed circuit although it is continuously receiving calories.

Thus, without adding cool water and without drawing off in the recuperator, a large part of the vapors of the combustion gases from the furnace 1 and of the vapors from the spraying evaporator 6 are recovered.

The impurities, whether recoverable or not, contained in the solution to be treated will be collected both at the bottom of the spraying evaporator 6 and at the bottom of the vat 11 of the recuperator, the separation thereof taking place owing to the spraying effected in these two apparatuses. Thus the losses of recoverable products such as soda carbonate will be prevented.

This present invention makes it possible to eliminate an economizer for the boiler as well as the carbonate receiving filters, for instance, of the plants now in use.

Fig. 4 shows the details of furnace 1 constructed separately from water tube boiler 3, to which it is connected by duct 2. The boiler and furnace can be of any ordinary type. A burner for black liquors is shown at 45, and a discharge duct for waste saline liquor is shown at 46. The inlet for combustion air is shown at 47. The exhaust gases and vapor are discharged at 5 at a temperature lower than the gases passing through connecting duct 2.

Fig. 5 shows a combined unit 40 which is the boiler 48 combined in a single unit with the furnace comprising burner 41. The combustion air intake is shown at 43, and the waste saline liquor is discharged at 42. The gases and vapors which have passed through the boiler are discharged at 44.

In the example of Fig. 2, 1 is, like in the previous example, the furnace in which the concentrated solution is burnt. The gases and vapors from the combustion which are, for instance, at a temperature of 1200° C. pass from said furnace through a duct 2. A portion of said gases and vapors (⅓ for instance) is by-passed through a duct 2′ into the spraying evaporator 6, whereas the other portion (the remaining ⅔, for instance, in the example under consideration) is directed through the duct 2 into the boiler 3 and are delivered therefrom dry and not saturated.

The mixture of gas and vapors entering the evaporator 6 meets in the latter, a liquid spray brought through the duct 7 and comprising, in part, as explained above for Fig. 1, preconcentrated solution and, in part, concentrated solution from the bottom of the evaporator 6 which is drawn therefrom by the circulation pump 8. A pipe 23 connecting, on the other hand, the bottom of the evaporator 6 to the furnace 1, feeds the latter with concentrated liquor.

The mixture of gas and vapor coming out through duct 9 of the evaporator 6, for instance at a temperature of about 150° C., enters a mixing condenser or recuperator 10 in which it meets a liquid spray from the vat 11 forming the base of said recuperator and into which flows, through the pipe 12, the spray cooling water which a pump 13 forces constantly to circulate in a closed circuit. The vapors produced in the vat 11 are sent through a pipe 16, at a temperature of 75° C., for instance, into the first tubular evaporator 17 which receives through pipe 18 the weak solution to be treated. Said liquor, which is already a little concentrated, after having passed through the first evaporator 17, passes through the duct 19 into a second tubular evaporator 20 heated with vapor at 60° C., for instance, from the first evaporator 17. At 21, the second evaporator 20 exhausts vapor at 45° C., for instance, which goes to a condenser (not shown) while the preconcentrated solution comes out at 22 of said evaporator to go to the spraying evaporator 6.

The mixture of gases and vapors coming out at the top of said recuperator 10 of Fig. 2, at a temperature of 75° C. in the example described, passes through a pipe 24 into a second recuperator 10' where it is drawn by an exhaust blower 14 provided at the top of said recuperator 10' which discharges it through duct 15 into the outer air, for instance. In the recuperator 10' the mixture of gas and vapors meets a liquid spray from the vat 11' which forms the foundation of said recuperator and into which flows through the pipe 12' the cooling water which a pump 13' causes constantly to circulate in a closed circuit. The vapors produced in the vat 11' which are in the present case at 60° C. are sent through a pipe 16' into the second tubular evaporator 20 with the vapors at the same temperature from the first tubular evaporator 17, as set forth hereinabove.

On the other hand, the mixture of gases and vapors which has passed through the boiler 3 and which, at the outlet thereof is at a temperature of 250° C., for instance, is driven through the pipe 5 into a third spray recuperator 10" similar to the previous ones; there, it meets a liquid spray from the vat 11" forming the foundation of said recuperator and into which flows, through the pipe 12", the cooling water which a pump 13" causes to circulate in a closed circuit. The vapors produced in the vat 11" which, in the example described, are at a temperature of 60° C., are sent back through the pipe 16" into the second tubular evaporator 20 where they mix with the vapors admitted through the pipe 16' at the same temperature. An exhaust blower 25 draws the gases from the top of the recuperator 10" and discharges them through pipe 26 at a temperature of 55–70° C. into the open air.

Of course, the temperatures hereinabove referred to are provided by way of non-limitative example only, for a better understanding of the invention. On the other hand, the recuperators such as 10, 10' and 10" may be in any appropriate number and it is the same for the tubular evaporators such as 17—20.

In the example of Fig. 3, in which the same reference numerals are used for the same parts as in Fig. 2, the plant comprises only one group of recuperators 10 and 10', series-mounted, but it is obvious that it might also comprise one or more recuperators parallel-connected like the one shown at 10" of Fig. 2. The mixture of gas and vapors drawn from the top of the recuperator 10', by the blower 14 is, in the present case, driven through a pipe 27 into a reheater 28 of known indirect heat exchanger type comprising for instance an array of tubes with transverse baffle plates which reheater receives through a pipe 5 the hot gases from the boiler 3 at a temperature of about 500° C. for instance, said gases being exhausted through duct 29 after giving off the major part of their calories, at a temperature of about 100° C. for instance.

Fig. 6 shows the details of the tubular indirect heat exchanger 28 of Fig. 3 in which the hot gases pass in paths separate from the gases to be heated, but in heat exchange relation therewith. The gases and vapors discharged through duct 5 from the boiler 3 are delivered through a header 50 through tubes 52, 52 from which they pass through header 51 to exhaust duct 29, while the gaseous mixture coming out of the top of recuperator 10' is delivered by duct 27 to the bottom of exchanger 28 and passes through exchanger 28 around tubes 52, in a zig-zag path between baffles 53.

The mixture of gas and vapors entering through pipe 27 into the reheater 28, at a temperature of about 70° C., for instance and pass around the baffle plates and the tubes of reheater 28 having the temperature thereof increased and then in a non-saturated condition, goes out through a pipe 30 saturated and at a temperature of 400° C., for instance; it is driven through said duct into an atomizing drier 31 where it meets a fine spray of concentrated solution having a temperature of about 40–50° C. for example brought from the bottom of the evaporator 6 through a pipe 32. The powder resulting from the drying of the solution is collected at the lower part of the atomizing dryer 31 from which it is extracted by an appropriate distributor 33 of any known type and driven thereby through a pipe 34 into the furnace 1 where its combustion takes place.

The mixture of gases and vapors coming out at the top of the atomizing dryer 31, for instance at a temperature of about 150° C., is driven through a pipe 35 into the evaporator 6 where it is treated as set forth previously for Fig. 1, the mixture coming out through pipe 9 from the evaporator 6 at a temperature of 100° C., for instance, passes successively through the recuperator 10 and 10' and the mixture coming out finally of the recuperator 10', at a temperature of about 70° C. is driven by the blower 14 through the pipe 27, as set forth hereinabove, into the reheater 28.

To prevent saturation with volatile products of the mixture of gases and vapors, which circulates in this way in a closed circuit, an air admission duct 36 will be advantageously connected, for instance, to the duct 27 and provided with a control valve 37 to let in a complementary provision of fresh air. A by-pass 38 connecting the duct 27 to the duct 34 makes it possible to divert the excess of air towards the furnace 1.

What I claim is:

1. In a system for burning liquids containing combustile substances, a furnace, a boiler, a spray evaporator tank having a spray head and also having a hot gas inlet connected to said boiler, and further having a bottom discharge outlet for concentrated combustible fuel connected to said furnace, a tubular evaporator unit having an inlet for weak combustible liquors to be concentrated and having a liquor outlet connected to said spray head of said spray evaporator tank, a two-piece re-cycling recuperating condenser comprising a base vat and a recuperating consender tank mounted above said vat and having a lower terminal pipe connection extending into said vat, a hot gas duct connecting the top of said evaporator tank to a point in said recuperating condenser tank, an exhaust duct at the top of said condenser tank for discharging non-condensable gases therethrough, said condenser tank having a spray head, said vat having an outlet near its bottom connected to said spray head of said condenser tank, and a connection for vapors from the upper part of said vat to said tubular evaporator unit.

2. A system according to claim 1, and a connection comprising a pump between an outlet in the bottom of said spray evaporator tank and said spray head of said spray evaporator tank.

References Cited in the file of this patent

UNITED STATES PATENTS

| | | |
|---|---|---|
| 1,137,779 | Moore | May 4, 1915 |
| 1,779,535 | Goodell | Oct. 28, 1930 |
| 2,039,444 | Oman et al. | May 5, 1936 |
| 2,056,266 | Goodell | Oct. 6, 1936 |
| 2,524,753 | Betts | Oct. 10, 1950 |
| 2,593,503 | Tomlinson et al. | Apr. 22, 1952 |

FOREIGN PATENTS

| | | |
|---|---|---|
| 7,962 | Great Britain | Apr. 14, 1905 |